United States Patent [19]

Takeuchi et al.

[11] Patent Number: 4,743,720

[45] Date of Patent: May 10, 1988

[54] CURRENT LIMITING CIRCUIT INTERRUPTER

[75] Inventors: Akira Takeuchi; Hideo Hisamoto; Takanobu Tanaka; Akihiko Hirao; Yoichi Aoyama; Junichi Matsuda; Takehiko Okada, all of Kadoma, Japan

[73] Assignee: Matsushita Electric Works, Ltd., Japan

[21] Appl. No.: 928,362

[22] Filed: Nov. 10, 1986

[30] Foreign Application Priority Data

Nov. 25, 1985 [JP] Japan ............................... 60-264253
May 26, 1986 [JP] Japan ............................... 61-120703

[51] Int. Cl.⁴ ............................................. B23K 9/32
[52] U.S. Cl. ............................... 200/147 R; 335/201
[58] Field of Search ..................... 200/147 R; 335/201

[56] References Cited

U.S. PATENT DOCUMENTS

| | | | |
|---|---|---|---|
| 2,555,799 | 2/1947 | Lerstrup . | |
| 3,483,343 | 12/1969 | Heft . | |
| 3,515,829 | 6/1970 | Hurtle, et al. . | |
| 3,516,090 | 6/1970 | Hurtle, et al. . | |
| 4,013,984 | 3/1977 | Wafer . | |
| 4,250,364 | 2/1981 | Kimblin, et al. . | |
| 4,451,718 | 5/1984 | Yamagata et al. | 200/147 R |
| 4,491,705 | 1/1985 | Hayashi, et al. . | |

FOREIGN PATENT DOCUMENTS

| | | |
|---|---|---|
| 2704160 | 3/1978 | Fed. Rep. of Germany . |
| 3334108 | 4/1985 | Fed. Rep. of Germany . |

OTHER PUBLICATIONS

European Search Report

*Primary Examiner*—Clifford C. Shaw
*Assistant Examiner*—Lincoln Donovan
*Attorney, Agent, or Firm*—Stevens, Davis, Miller & Mosher

[57] ABSTRACT

A circuit interrupter includes an arc extinction assembly for magnetically driving or blowing out an arc formed between a stationary contact and a movable contact. The assembly comprises a pair of coaxial windings which are disposed in proximity to the contacts so that the internal lines of magnetic force generated by and passing inside of the windings can act directly on the arc for magnetically driving the arc in one direction. A magnetic flux diverting yoke is provided in association with the windings to diverse therethrough the external lines of magnetic force generated by and passing outside of the windings such that the arc and a portion of the movable contact arm carrying the same will not be under the influence of the external lines of magnetic force even when the contact separation proceeds to a stage where the arc is extended past the region which is totally under the influence of the internal lines of magnetic force. Otherwise, the external lines of magnetic force would pass through the arc and the portion of the movable contact arm in the opposite direction to the internal lines of magnetic force, causing the adverse magnetic effect of retarding the arc extinction and contact separation.

15 Claims, 11 Drawing Sheets

CURRENT LIMITING CIRCUIT INTERRUPTER

BACKGROUND OF THE INVENTION

1. Field of the Invention

The present invention is directed to a current limiting circuit interrupter, and more particularly to a current limiting circuit interrupter with magnetic arc driving means.

2. Description of the Prior Art

Circuit interrupters with magnetic arc driving means are well known in the art for effecting rapid current limiting action by magnetically blowing out or elongating the arc formed between the arcing contacts upon passage of overcurrents in excess of the rated current of the circuit. One form of the arc driving means effective for magnetically elongating the arc is to provide one or more magnetic windings in the vicinity of the arcing contacts for producing lines of magnetic force which act on the arc to magnetically drive it for elongation thereof. Although the magnetic windings are preferred for a rapid arc extinction purpose from the viewpoint that the arc at its instance of formation can be rapidly driven by the external magnetic field produced by the windings rather than the magnetic field to be produced by the arc current itself, there is certain limitation to the size of the windings for maintaining the heat loss thereof at a minimum in addition to increasing the intensity of the magnetic force to be applied to the arc for effective arc driving. In this sense, small-sized magnetic windings are preferred to be disposed in close relation to the arcing contacts in order to concentrate its lines of magnetic force to the arc for effective and rapid magnetic drive thereof. However, with the utilization of small-sized windings, there arises another problem that the entire arc path or the contact separation distance cannot be laid under the influence of the desired magnetic field generated by the windings to drive the arc in one direction. In other words, when the windings are disposed around the contacts in an attempt to concentrate its internal lines of magnetic force passing inside of the windings to the arc for driving it in one direction, this magnetic drive effect would be only available for the initial contact separation where the arc path is totally under the influence of such internal lines of magnetic force. Once the contact separation proceeds to a stage where the arc path or contact separation distance is extended to go out of the region under the influence of the internal lines of magnetic force, the portion of the arc outside of that region would be certainly subjected to the external lines of magnetic force which pass outside of the windings to transverse the arc path in the opposite direction to the internal lines of magnetic force and is therefore driven thereby in the opposite direction, adversely affecting the arc elongation.

SUMMARY OF THE INVENTION

The present invention eliminates the above problem and provides an advantageous feature for effectively driving the arc with the use of magnetic windings of which lines of magnetic force act directly to the arc for elongation thereof. A current limiting interrupter of the present invention comprises a pair of main contacts for relative movement between a closed position in which the contacts are in mutual engagement and an open position in which the contacts are separated to define an arc gap therebetween. Upon occurrence of an overcurrent condition, arcing in the arc gap occurs along an arc path between the contacts as the contacts are moved from the closed position to the open position. Provided in proximity to the contacts is magnetic winding means which is energized by a current flowing through the contacts for producing internal lines of magnetic force passing inside of the winding and extending transversely of the arc path. The internal lines of magnetic force act directly on the arc formed between the contacts so as to drive it in one direction for elongation thereof during the initial stage of contact separation in which the arc path is relatively shorter to be totally under the influence of the internal lines of magnetic force.

Associated with the magnetic winding means is magnetic flux diverting yoke means for diverting therealong the external lines of magnetic forces generated by and passing outside of the winding in order to prevent them from adversely acting on the arc and to permit only the internal lines of the magnetic force to act on the arc in such a manner as to continuously drive it in the same direction even in the subsequent stage of contact separation where the arc path is elongated as the contacts are separated to extend past the region which is totally under the influence of the internal lines of magnetic force. Thus, the adverse effect of retrogressing the arc due to the external lines of magnetic flux passing outside of the winding can be successfully avoided to ensure effective arc driving or arc elongating operation. This combination of the magnetic winding means plus the magnetic flux diverting yoke means therefore enables the use of small-sized winding for positively and effectively driving the arc without causing any adverse effect.

Accordingly, it is a primary object of the present invention to provide a current limiting circuit interrupter which features a unique combination of magnetic winding means and magnetic flux diverting yoke means advantageous for effective arc driving operation with the use of small-sized windings.

When one of the main contacts is held on a movable contact arm which has a portion extending transversely of the arc path, the movable contact arm can take advantage of the internal lines of magnetic force from the winding means to be magnetically driven in the direction of opening the contacts by an overcurrent flowing through the movable contact arm itself. In such case, the external lines of magnetic force should be also eliminated from acting on the moving contact when it goes out of the region where it is totally under the influence of the internal lines of magnetic force. Otherwise, the external lines of magnetic force would act adversely on the movable contact arm to impede the contact separation. Also in this respect, the above combination of the winding means and the magnetic flux diverting yoke means is advantageous for ensuring rapid contact separation movement of the movable contact arm upon an overcurrent condition, which is therefore another object of the present invention.

In a preferred embodiment, the magnetic flux diverting yoke means is formed with an arc driving yoke extension which responds to the arc current itself for producing a magnetic field where the arc being elongated by the action of the magnetic winding means and is further driven to be elongated. With this provision of the arc driving yoke extension, the arc can be driven successively to be elongated, enabling effective arc extinction without relying upon a conventional arc chute.

It is therefore a further object of the present invention to provide a current limiting circuit breaker which assures effective arc extinction.

Nevertheless, a arc chute may be available when associated with the above combination for further enhancing the arc extinction. The arc chute may comprise a series of stacked arc cooling plates which receives the elongated arc at the edges of the plate for extinction of the arc.

In the preferred embodiments, the main contacts comprise a stationary contact on a fixed contact carrier and a movable contact arm carrying at its one end a movable contact engageable with the stationary contact, and a magnetic winding means comprises a pair of coaxial windings which are integrally formed with the contact carrier to be disposed on the sides of the stationary contact in closely adjacent relation thereto. The windings are connected electrically in parallel relation to each other between the stationary contact and one of the terminals of the circuit interrupter so as to be coactive by the current flow therethrough to generate the internal lines of magnetic force which directly act on the arc for driving the same in one direction for elongation of the arc. The integral formation of the windings with the contact carrier gives rise to a simple and compact arrangement for the structure and the electric connection of the windings and contact combination, which is very convenient for assembling. Most preferably, the contact carrier is integrally formed at its end with one of the terminals in order to further facilitate its assembly.

It is therefore a further object of the present invention to provide a current limiting circuit breaker in which the windings are integrally combined into a contact structure, contributing to easy and compact mounting thereof in a limited space within a circuit interrupter housing.

Disposed between each of the windings and the stationary contact in closely adjacent relation to the corresponding windings are insulation plates which protect the winding from exposure to the arc for preventing the deterioration thereof. A U-shaped yoke member of magnetizable material defining the magnetic flux diverting yoke means can be held in position with the limbs of the U being in juxtaposed relation to the respective windings for magnetic coupling therebetween, so that the U-shaped yoke member can concentrate or diverse therealong the external lines of magnetic force generated by and passing outside of the windings for preventing the adverse arc driving effect due to the external lines of magnetic force as described in the above.

It is therefore a still further object of the present invention to provide a current limiting circuit interrupter in which the U-shaped yoke members defining the magnetic diverting yoke means can be held in position for magnetic coupling with the windings by better utilization of the insulation plates protecting the windings from exposure to the arc.

Preferably, the insulation plates which are inherently exposed to the arcing may be made of an ablative arc quenching material which produces hydrogen in gaseous form upon exposure to the arcing. The quenching action of the hydrogen gas generated in the arcing environment is added to the magnetic arc elongation for further enhancing the arc extinction. Among the ablative arc quenching material, polymethylpentene and polymethylmethacrylate resins are newly found to exhibit remarkable arc quenching characteristics.

It is therefore a still further object of the present invention to provide a current limiting circuit interrupter in which the arc extinction is further enhanced by the combined effect of the magnetic arc drive and the arc quenching gas.

In another form of the present invention, the magnetic flux diverting means or U-shaped yoke member has an integral extension elongated in the lengthwise direction of the movable contact arm for defining a slot motor with a slot into which extends a substantial portion of the movable contact arm. The slot motor serves to generate a magnetic field in response to an overcurrent flowing through the movable contact arm itself, whereby the movable contact arm is magnetically driven under the influence of thus generated magnetic field in the direction of opening the contacts upon occurrence of an overload current condition.

It is therefore a further object of the present invention to provide a current limiting circuit interrupter in which the slot motor effect can be readily incorporated for ensuring rapid current limiting interruption.

The present invention discloses still other advantageous and useful features including the provision of an arc runner and the provision of a shield member for the contact carrier. The arc runner extends from the stationary contact in the arc driving direction for expediting the arc movement. The shield member overlies a substantial portion of the contact carrier except for the stationary contact for shielding that portion from exposure to the arcing.

These and still other objects and advantages of the present invention will be more apparent from the following description of the preferred embodiments when taken in conjunction with the accompanying drawings.

DETAILED DESCRIPTION OF THE PREFERRED EMBODIMENTS

First embodiment [FIGS. 1 through 4]

Figure 1:
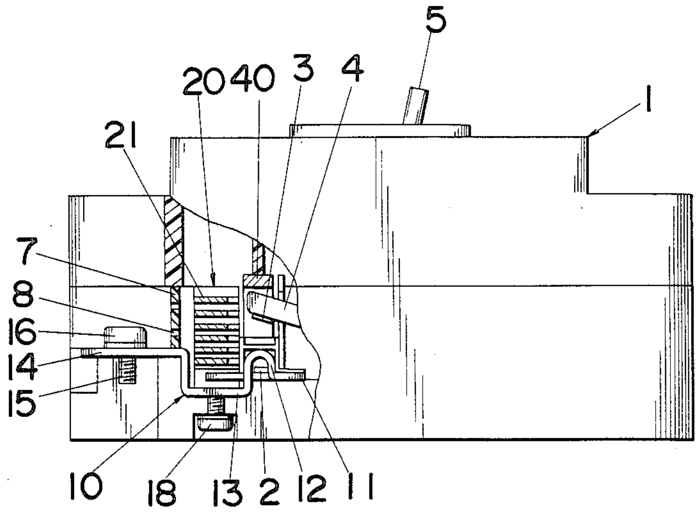
FIG. 1 is a schematic representation showing a principal portion of a circuit interrupter in accordance with a first preferred embodiment of the present invention.
Figure 2:
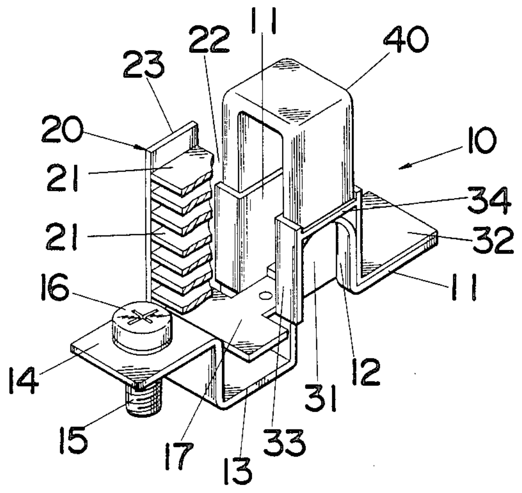
FIG. 2 is a perspective view of an arc extinction assembly to be mounted within a housing of the circuit interrupter.

In accordance with a first preferred embodiment of the present invention, there is shown a current limiting circuit breaker which has within a housing 1 a single pair of main contacts and an arc extinction assembly 10. The main contacts comprise a stationary contact 2 and a movable contact 3 carried at one end of a movable contact arm 4 which is pivoted at the other end thereof for pivotal movement between a closed position in which the movable contact 3 is engaged with the stationary contact 2 and an open position in which the movable contact 3 is separated from the stationary contact 2. The pivoted end of the movable contact arm 4 is operatively connected to a manual handle 5 through a suitable linkage (not shown) for manual contact operation and at the same time it is electrically connected to a load terminal (not shown) of the circuit interrupter. The circuit interrupter may include electromagnetically and thermally operable tripping means which is linked to the movable contact arm 4 for contact opening upon occurrence of fault current conditions.

Figure 3:
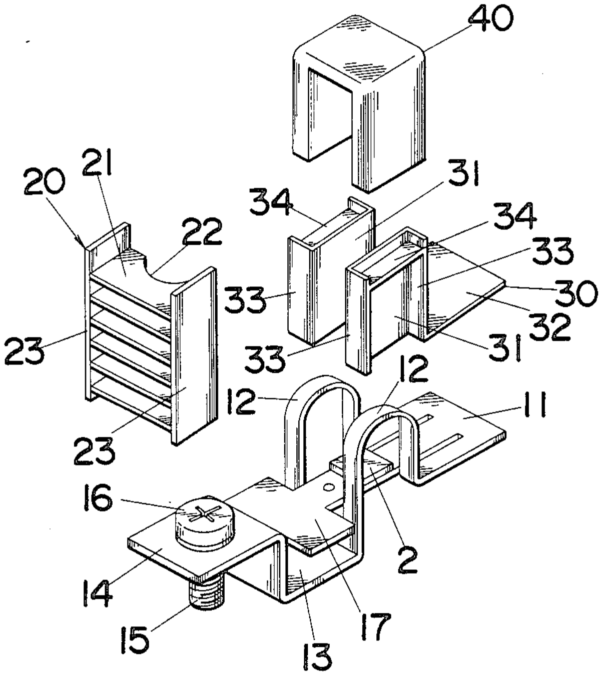
FIG. 3 is an exploded perspective view of the arc extinction assembly of FIG. 2.

The arc extinction assembly 10 comprises a base plate which is struck from a metal sheet of electrically conductive material and is formed integrally with a contact carrier 11 mounting the stationary contact 2 thereon, a pair of coils or windings 12, and a terminal tab 14, as best shown in FIG. 3. The contact carrier 11 is in the form of a generally E-shaped configuration with an elongated center leg carrying at its end the stationary contact 2 and a pair of parallel outer legs connected at the ends respectively to the windings 12. The center leg of the contact carrier 11 extends in generally parallel relation with a substantial portion of the movable contact arm 4 when in its ON position so that the movable contact arm 4 can be magnetically repelled from the center leg for rapid contact separation by the interaction of magnetic fields generated therearoud when there flow overcurrents in excess of the current interrupting rating of the interrupter. The windings 12 are disposed on the sides of the stationary contact 2 in coaxial relation to each other and are connected at the other ends opposite to the outer legs of the contact carrier 11 to a lowered flat shelf 13 leading to the terminal tab 14 which defines with a gripping screw 15 a line terminal 16 of the interrupter. Thus, a complete current path of the circuit interrupter is provided through the line terminal 16, flat shelf 13, two branches of windings 12, contact carrier 11, stationary contact 2, movable contact 3, movable contact arm 4, and the load terminal.

A T-shaped arc runner 17 is connected at its end to the contact carrier 11 to extend therefrom toward the terminal tab 14 in spaced relation to the flat shelf 13 and the terminal tab 14. The connected end of the arc runner 17 abuts against the stationary contact 2 in such a way that it has its upper surface flush with the contact surface of the stationary contact 2. Disposed above the arc runner 17 is an arc chute 20 comprising a number of stacked arc cooling plates 21 each formed with an arc receiving notch 22. The arc cooling plates 21 are held between opposed side plates 23 of electrically insulating material.

Also included in the arc extinction assembly 10 is a support member 30 of electrically insulation material having a pair of laterally spaced insulation plates 31 and a shield tang 32 integrally connecting the plates 31 at the ends thereof. Each of the insulation plates 31 is disposed between the stationary contact 2 and each of the windings 12 in closely adjacent relation to the corresponding winding 12 so as to protect the same from exposure to the arc which is formed between the contacts 2 and 3 when they are separated in response to the overcurrent in excess of the current interruption rating. The shield tang 32 covers the entire upper surface of the contact carrier 11 other than the stationary contact 2 for protection thereof from exposure to the arc. Each insulation plate 31 has opposed end flanges 33 and an upper flange 34 extending outwardly to define therebetween a bottom-open recess into which the corresponding winding 12 fits.

A U-shaped magnetic yoke 40 with a pair of limbs straddles the insulation plates 31 with the lower ends of the limbs supported on the upper flanges 34 of the insulation plates 31 in order to magnetically couple the yoke 40 to the windings 12 as well as to define a vertically elongated space in which the movable contact 3 is driven to move between the ON and OFF positions. That is, the movable contact 3 and the portion of the movable contact arm 4 carrying the same is operated to move upwardly past the upper ends of the windings 12 before reaching its fully separated OFF position. In this embodiment, the magnetic yoke 40 is coated with a film 43 of an electrically insulative material such as epoxy resin to lessen deterioration of the yoke 40 when exposed to the arc. The arc extinction assembly 10 thus constructed is secured in a fixed position within the housing 1 by extending a fastening screw 18 into a threaded hole in the flat shelf 13 through the bottom wall of the housing 1.

Figure 4:
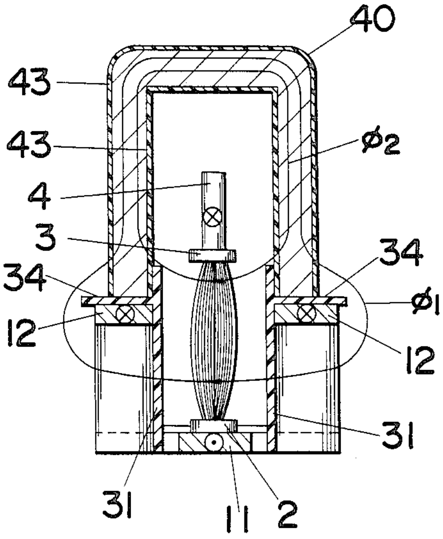
FIG. 4 is an explanatory view illustrating the operation of the arc extinction assembly.

In operation, when the contacts are separated in response to the overcurrents in excess of the current interrupting ratings, arcing occurs between the contacts 2 and 3. At this instance, the windings 12 in a pair are coactive to generate by such overcurrent internal lines of magnetic forces passing inside of the windings 12 and transversely of the arc gap between the arcing contacts 2 and 3. Such internal lines of magnetic force of sufficient strength act on the arc to drive or blow out the same toward the arc chute 20 for elongation thereof. In this condition, the magnetic yoke 40 acts to divert or concentrate therealong the external lines of magnetic force generated to pass outside of the windings 12, thus completing the magnetic flux path $\phi_1$ which extends through the yoke 40 and the open space between the windings 12, as shown in FIG. 4. Consequently, the vertically elongated space covering the entire traveling path of the movable contact 3 and the associated portion of the movable contact arm 4 can be substantially free from the influence of the external lines of magnetic force, so that the arc as well as the movable contact arm 4 can be subjected only to the lines of magnetic force of particular direction facilitating the arc extinction and the contact separation during the entire course of contact separation.

Without this magnetic flux diverting yoke 40, the upper portion of the arc being extended past the upper end of the windings 12 as the contact separation proceeds would be subjected to the external lines of magnetic force passing outside of the windings 12 so as to be adversely driven magnetically in the opposite direction, eventually resulting in the retardation of the arc extinction. Further, if such external lines of magnetic force are not diverted by the magnetic yoke 40, they would also pass transversely of the movable contact arm 4 and would consequently act on the current flowing through the movable contact arm 4 to thereby magnetically drive the same in the contact closing direction, also resulting in the hindrance of the contact separation.

In this sense, the above combination of the windings 12 and the magnetic yoke 40 is particularly advantageous in that the internal lines of magnetic force generated by the windings 12 can be used to directly act on the arc at the initial stage of contact separation for effective arc extinction without causing any adverse effects due to the external lines of magnetic force in the rest of contact separation stage. This makes it possible to utilize the winding 12 of small-sized configuration for effectively acting the magnetic force on the arc at the very instant of the arc formation to rapidly enhance the arc blow-out effect as well as for meeting the requirement to maintain the heat loss of the windings 12 at a minimum. It is noted at this point that the magnetic field also generated in the yoke 40 due to the curıent flow through the movable contact arm 4 also has the magnetic flux $\phi_2$ passing in the same direction of the magnetic flux $\phi_1$ generated by the windings 12 and therefore will not weaken the magnetic force to be applied to the arc and therefore not impede the arc driving action by the windings 12.

Figure 18:
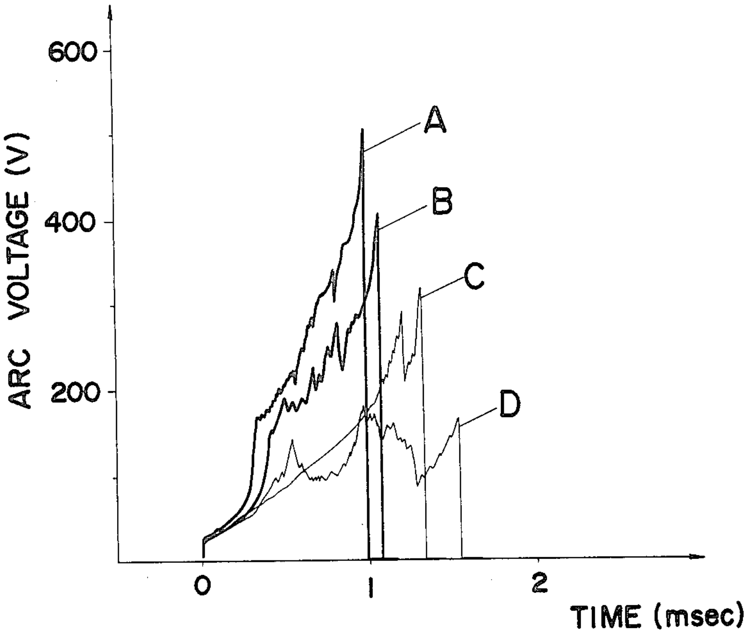
FIG. 18 is a graphical representation showing arc quenching characteristics of novel ablative arc quenching materials in relation to the conventional ablative arc quenching materials.

The support member 30 of the yoke 40, which also serves to protect the windings 12 and the contact carrier 11 from exposure to the arcing and therefore define the exposed surfaces to the arcing, is made of an ablative arc quenching material which produces hydrogen in gaseous form upon exposure to the heat of the arcing for providing an added effect to enhancing the arc extinction. In the present invention, polymethylpentene or polymethylmethacrylate is utilized as the solid arc quenching material which is newly found to exhibit remarkable arc quenching characteristics over the known conventional arc quenching materials such as polyacetal resins. This is confirmed in FIG. 18 which shows in graphical representation arc the characteristic curves of voltages with respect to arc extinction time obtained by the use of several ablative arc quenching materials including polymethylpentene (curve A), polymethylmethacrylate (curve B), polyacetal (curve C), and ceramics basically composed of aluminum oxides (curve D). The tests were conducted in the condition that the contacts made of 60% Ag-40% W metal were rapidly opened at a contact separation speed of 3 m/sec with an excess current of 1 kA of 60 kHz under the influence of magnetic flux density of 2kGs. From the results of FIG. 18, it is apparent that the arc quenching materials (A and B) of the present invention are responsible for increased arc voltages, which assures rapid current limiting action within about 1 miliseconds from the incidence of the overcurrent conditions.

Such material can be also utilized as the side plates 23 of the arc chute 20 or any other structure to be exposed to the arc. An end plate 7 with vents 8 is provided adjacent the exhaust end of the arc chute 20 for expelling the gases developed due to the arcing outwardly through the vents 8.

Figure 5:
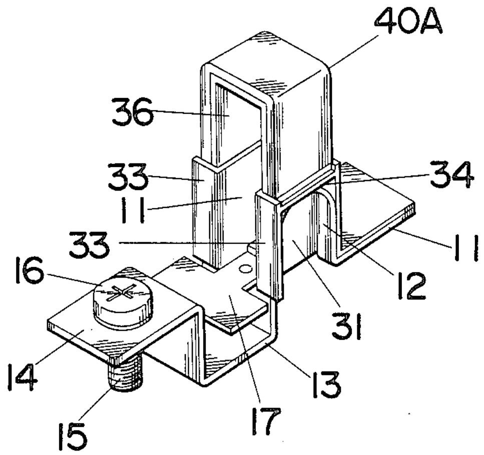
FIG. 5 is a perspective view of a first modification of FIG. 1.
Figure 6:
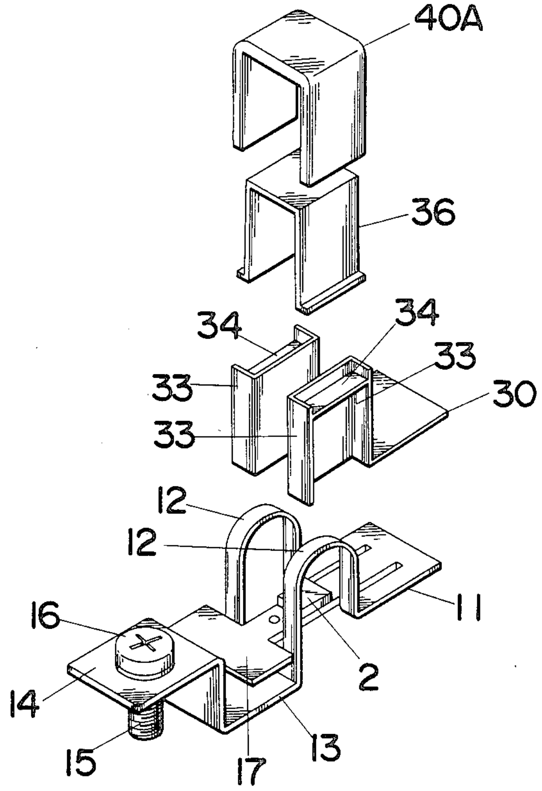
FIG. 6 is an exploded perspective view of FIG. 5.

First modification [FIGS. 5 and 6]

Referring to FIGS. 5 and 6, there is shown a first modification of the first embodiment which is identical in structure to the first embodiment except for the employment of like magnetic yoke 40A without the arc-resistive coating. The magnetic yoke 40A fits closely on a correspondingly shaped saddle member 36 and is supported thereby on the like support member 30 for magnetic coupling to the windings 12. The saddle member 36 which covers the interior surface of the magnetic yoke 40A to be exposed to the arc is also made of the above ablative arc quenching material for the arc quenching purpose.

Figure 7:
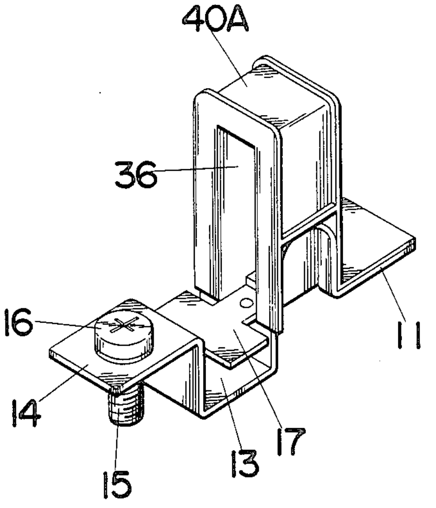
FIG. 7 is a perspective view of a second modification of FIG. 1.
Figure 8:
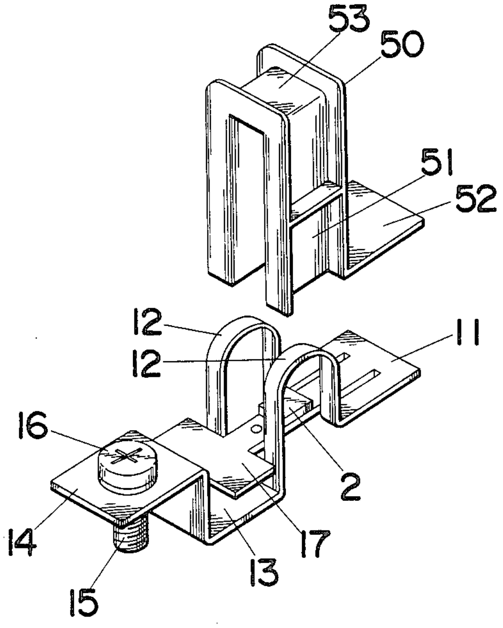
FIG. 8 is an exploded perspective view of FIG. 7.

Second modification [FIGS. 7 and 8]

In a second modification of the above embodiment, a one-piece insulation member 50 of the above ablative arc quenching material is utilized for supporting the magnetic yoke 40A without the arc-resistive coating as well as for protecting the windings 12 and the contact carrier 11 from exposure to the arc. For this purpose, the insulation member 50 is formed to have an insulation plate section 51 for the windings 12, a shield tang section 52 for the contact carrier 11, and a saddle section 53 for the magnetic yoke 40A. The other structure is identical to the above embodiment and therefore like numerals designate like parts.

Figure 9:
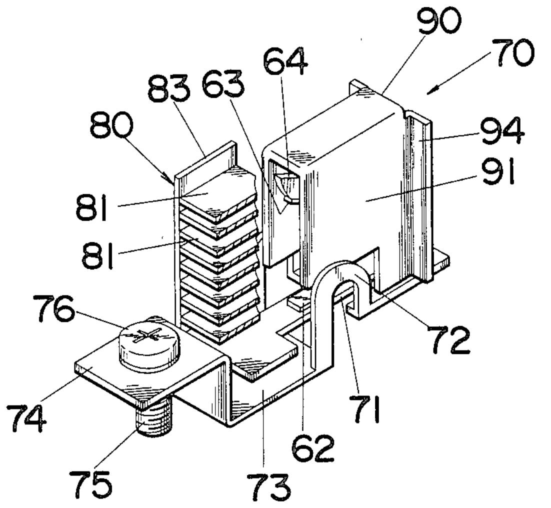
FIG. 9 is a perspective view of an arc extinction assembly in accordance with a second embodiment of the present invention.
Figure 10:
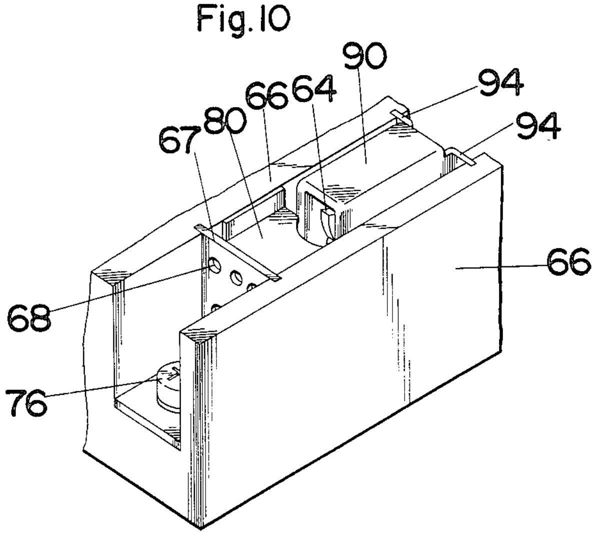
FIG. 10 is a perspective view of the arc extinction assembly of FIG. 9 mounted in a portion of a circuit interrupter.
Figure 11:
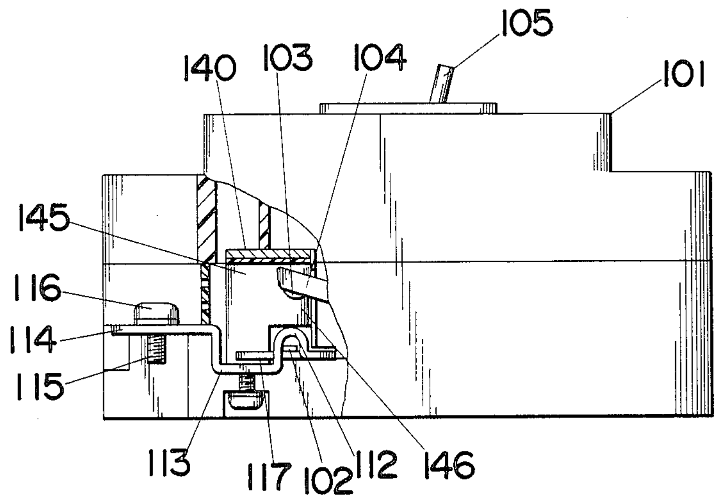
FIG. 11 is a schematic representation showing a principal portion of a circuit interrupter in accordance with a third preferred embodiment of the present invention.
Figure 12:
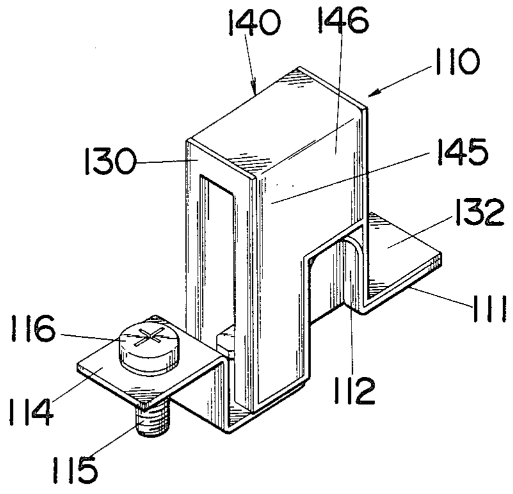
FIG. 12 is a perspective view of an arc extinction assembly to be mounted within a housing of the circuit interrupter of FIG. 11.
Figure 13:
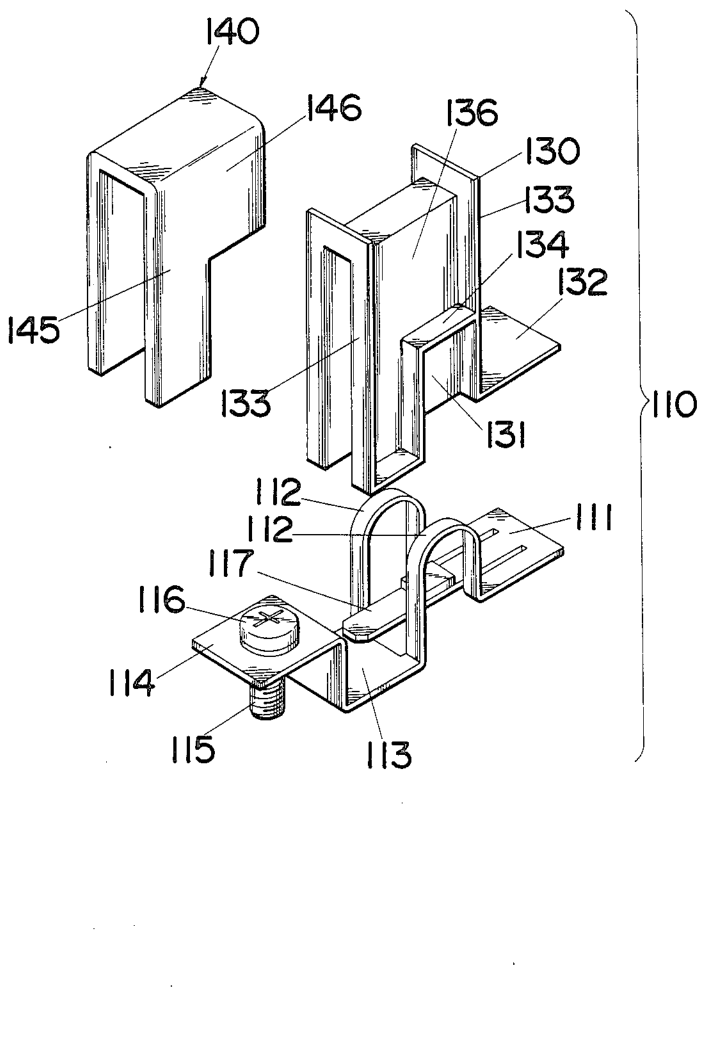
FIG. 13 is an exploded perspective view of the arc extinction assembly of FIG. 12.

Second embodiment [FIGS. 9 and 10]

In accordance with a second embodiment of the present invention, an arc extinction assembly 70 is shown to include a contact carrier 71 with a stationary contact 62, a pair of coaxial windings 72, lowered flat shelf 73, and a terminal tab 74, all of the same configuration as in the previous embodiment. The terminal tab defining with a gripping screw a line terminal of the interrupter. The stationary contact 62 is engageable with a movable contact 63 on one end of a movable contact arm 64 which is pivoted at the other end for movement between an ON position of closing the contacts and an OFF position of separating the contacts. Also included in the assembly 70 are like arc chute 80 with a series of stacked arc cooling plates 81 held between side plates 83 and a magnetic yoke 90 in the form of being elongated in the lengthwise direction of the movable contact arm 64. The elongated yoke 90 defines along its entire length a slot motor having a correspondingly elongated slot into which extends substantially the entire length of the movable contact arm 64 and defines at the forward portion thereof a magnetic flux diverting section 91 which is coactive with the windings 72 for arranging the lines of magnetic force generated thereby to act effectively on the arc and the movable contact arm 64 as described hereinbefore. The slot motor operates to generate a magnetic field in response to the overcurrent flowing through the movable contact arm 64 to thereby magnetically drive the movable contact arm 64 in the contact opening direction for further enhancing the contact separation. The magnetic yoke 90 is likewise coated with the arc-resistive plastic material for preventing the deterioration thereof when exposed to the arcing and is mounted on the contact carrier 71 with its rear lips 94 engaged in grooves in the opposed side walls 66 confining therebetween a compartment into which the arc extinction assembly 70 is mounted. The front portion of the magnetic yoke 90 or the magnetic flux diverting yoke section 91 is notched at its lower end at which portion it is magnetically coupled to the windings 72 for completing the magnetic flux path. In this embodiment, the side walls 66 of the compartment may be made of the ablative arc quenching material of the kind described in the above. An end plate 67 with vents 68 is provided adjacent the exhaust end of the arc chute 80 for expelling the gases developed due to the arcing outwardly through the vents 68.

Third embodiment [FIGS. 11 through 15]

In accordance with a third embodiment of the present invention, there is shown a circuit interrupter which is identical in construction to the first embodiment except that a particularly configured magnetic yoke 140 is utilized in an arc extinction assembly 110. Likewise in the first embodiment, the circuit interrupter comprises a housing 101 with a manual handle 105 linked to a movable contact arm 104 which carries at its end a movable contact 103 and is pivoted at the other end for pivotal movement between an ON position of engaging the movable contact 103 with a stationary contact 102 and an OFF position of separating the movable contact 103 from the stationary contact 102. The movable contact arm 104 may be linked to electromagnetically and thermally operable tripping means for contact opening upon occurrence of fault current conditions. Like contact carrier 111 is shown to be integrally formed with the stationary contact 102, a pair of windings 112, lowered flat shelf 113, terminal tab 114 defining with a wire gripping screw 115 a line terminal 116. The magnetic yoke 140 has a forward extension 145 which defines an arc driving yoke section for further enhancing the arc elongation in combination with the windings 112. The arc driving yoke section 145 has a pair of longer legs depending down closely to the shelf 113 of the contact carrier 111 past an arc runner 117 integrally extending from the contact carrier 111 toward the terminal tab 114 in order to confine therebetween the arc being driven to be blown-out by the action of the windings 112. The rear portion of the yoke 140 defines the magnetic flux diverting yoke section 146 which serves to avoid the adverse effects of retarding the arc elongation and contact separation by concentrating the lines of magnetic force generated by the windings 112 through the yoke section 146, for the same reason described in the first embodiment.

Figure 14A:
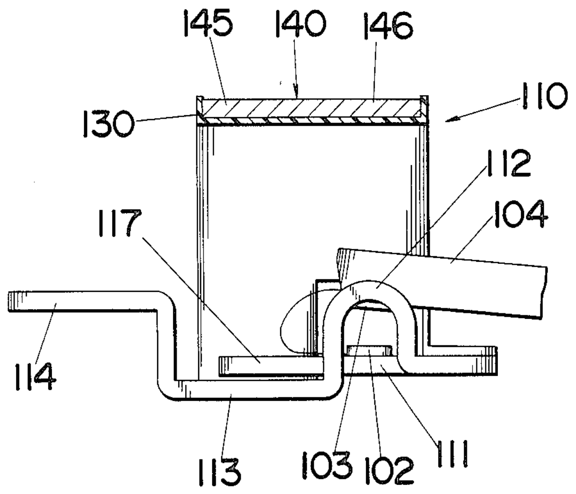
FIGS. 14A, 14B, 15A, and 15B are respectively explanatory views illustrating the operation of the above arc extinction assembly.
Figure 14B:
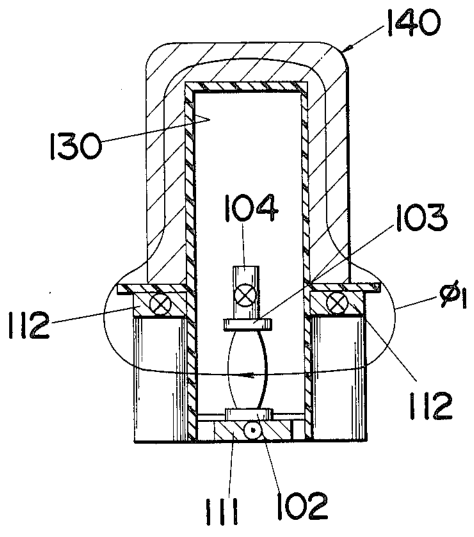
Figure 15A:
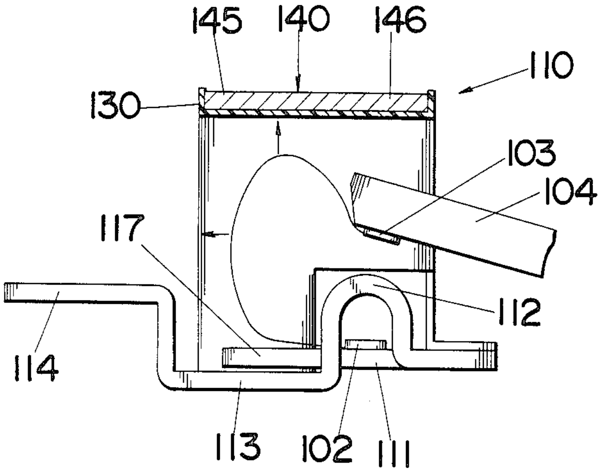

The operation of the arc driving yoke section 145 will be explained with reference to FIGS. 14A, 14B, 15A and 15B. At the initial stage of the arc formation, the arc is driven by the interaction of the magnetic flux $\phi_1$ (FIG. 14B) generated by the winding 112 and the arc current so as to be blown out toward the terminal tab 114 as being elongated in an arcuate path as shown in FIG. 14A. As the contact separation proceeds, the arc path is extended to have a substantial portion thereof advanced to the region confined between the legs of the arc driving yoke section 145 with one end of the arc kept anchored to the arc runner 117, as shown in FIG. 15A. In this stage, the magnetic field generated by the arc current itself is concentrated through the arc driving yoke section 145 which in turn acts to magnetically drive the arc at its middle and upper portion in the outward direction respectively indicated by arrows in the figure for further enhancing the arc elongation to extinction thereof. With the inclusion of this arc driving yoke section 145, effective arc extinction can be obtained without the help of the conventional arc chute, eliminating the arc chute from the arc extinction assembly and therefore enabling the assembly to be made compact. This is particularly advantageous for miniaturization of the circuit interrupter incorporating the assembly. Nevertheless, the arc chute can be incorporated as necessary.

Figure 15B:
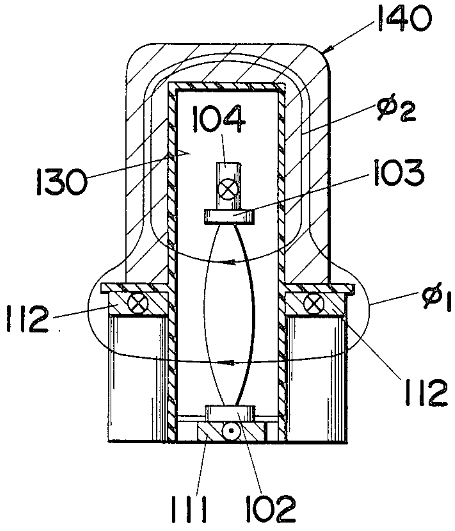

It is also to be noted at this point that the magnetic flux path $\phi_2$ generated by the current flow through the movable contact arm 104 will pass through the magnetic flux diverting section 146 in the same direction has the flux $\phi_1$ generated by the windings 112, as shown in FIG. 15B, so that it will not be the cause of weakening the magnetic force to be applied to the arc and therefore not act to impede the arc driving action.

The magnetic yoke 140 thus formed to integrally combine the magnetic flux diverting yoke section 146 and the arc driving yoke section 145 is held in relation to the contact carrier 111 by means of a support member 130 of electrically insulative material preferably made of the ablative arc quenching material as disclosed in the previous embodiments. The support member 130 is configured to be fit inside of the magnetic yoke 140 and includes a saddle 136 for the magnetic yoke 140, insulation plates 131 disposed adjacent to the respective windings 112 for protection thereof from exposure to the arc, and further includes a shield tang 132 for covering the contact carrier 111 at a portion rearwardly of the stationary contact 102.

The lower end of the magnetic flux diverting yoke section 146 is electrically insulated from the corresponding windings 112 by an integral flange 134 but is magnetically coupled thereto for completing the magnetic flux path $\phi_1$. The end faces of the magnetic yoke 140 are covered by end flanges 133 also integral with the support member 130.

Figure 16:
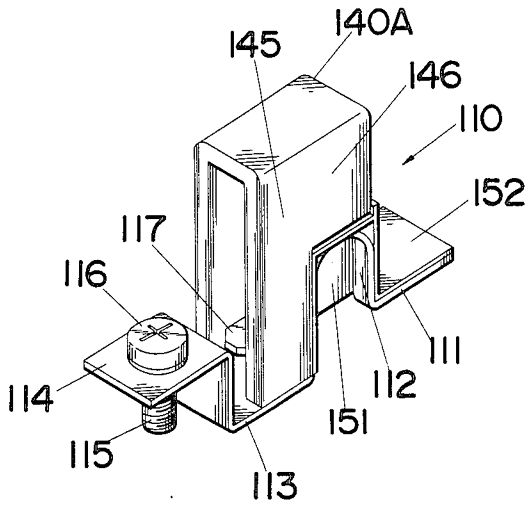
FIG. 16 is a perspective view of a modification of FIG. 11.
Figure 17:
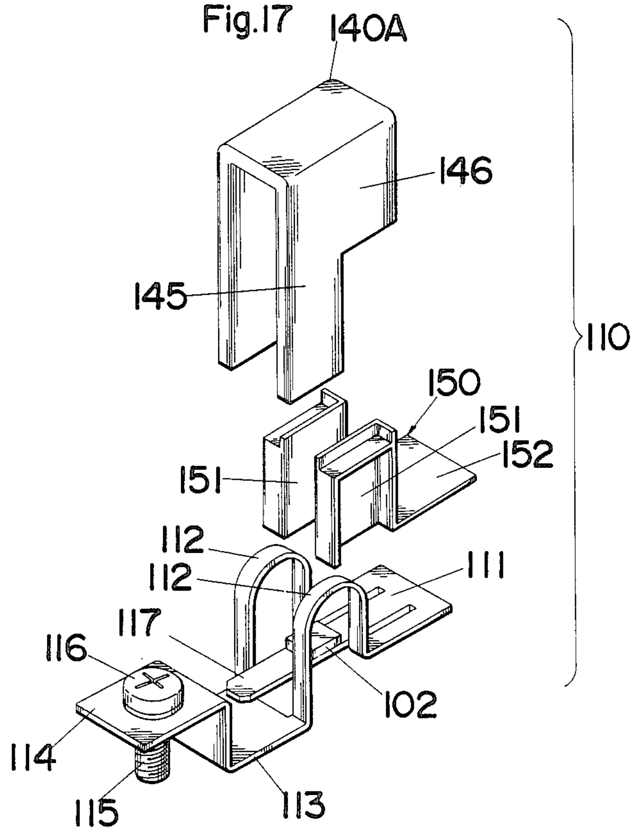
FIG. 17 is an exploded view of FIG. 16.

Referring to FIGS. 16 and 17, there is shown a modification of the third embodiment which is identical to the third embodiment except that the magnetic yoke 140A is coated with a film 143 of the arc-resistive insulation material. In this modification, a support member 150 for the magnetic yoke 140A is in the form of simple structure, as employed in the first embodiment, comprising a pair of insulation plates 151 and a shield tang 152 for protecting the windings 112 and the contact carrier 111, respectively.

What is claimed is:

1. A current limiting circuit interrupter comprising:

a pair of main contacts comprising a stationary contact and moveable contact mounted for relative movement along a path between a closed position in which the contacts are in mutual engagement and an open position in which the contacts are separated to defined an arc gap therebetween, arcing in said arc gap occurring along an arc path between the contacts as the contacts are moved from the closed position to the open position upon occurrence of an overcurrent condition;

magnetic winding means provided in immediate adjacent proximity to the stationary contact and energized by a current flow through the contacts for producing within the winding thereof internal lines of magnetic force which extend transversely of the arc path to directly act on the arc formed between the contacts at the stationary contact whereby driving the arc in one direction for elongation thereof during the initial stage of contact separation in which the art path is relatively shorter so that the arc is totally under the influence of the internal lines of magnetic force; and magnetic flux diverting yoke means adjacent the path of movement of the moveable contact and positioned to be magnetically coupled with the magnetic winding means for diverting therealong the external lines of the magnetic force generated by and passing outside of the winding of the magnetic winding means in order to prevent the external line of magnetic force from adversely acting on the arc and to permit only the internal lines of the magnetic force to act on the arc in such a manner as to continuously drive the arc in series and in the same direction in the subsequent stage of contact separation where the arc path is elongated as the contacts are separated to extend past the region which is totally under the influence of the internal lines of magnetic force.

2. A current limiting circuit interrupter as set forth in claim 1, wherein said magnetic flux diverting yoke means is formed with an arc driving yoke extension which responds to the arc current itself for producing a magnetic field where the arc being elongated by the action of the magnetic winding means is further driven to be elongated.

3. A current limiting circuit interrupter as set forth in claim 1, further including an arc with a series of stacked arc cooling plates positioned to receive the elongated arc driven by the magnetic winding means for extinction of the arc.

4. A current limiting circuit interrupter as set forth in claim 1, wherein said magnetic winding means comprise a pair of coaxial windings which are integrally formed with the contact carrier to be disposed on the sides of the stationary contact, said windings being connected electrically in parallel relation to each other between the stationary contact and one of the terminals of the circuit interrupter so as to be coactive by the current flow therethrough to produce the internal lines of magnetic force which directly act on the arc formed between the contacts for driving the same in one direction for elongation of the arc.

5. A current limiting circuit interrupter as set forth in claim 4, wherein said terminal is formed integrally with the contact carrier and the windings.

6. A current limiting circuit interrupter as set forth in claim 4, wherein said contact carrier is formed with an arc runner extending from the stationary contact in the arc driving direction.

7. A current limiting circuit interrupter as set forth in claim 1, wherein said magnetic flux diverting yoke means includes an extension elongated in the lengthwise direction of the movable contact to define a slot motor with a correspondingly elongated slot into which extends a substantial portion of the movable contact arm, said slot motor responding to an overcurrent flowing through the movable contact arm for generating a magnetic field by which the movable contact arm is magnetically driven in the direction of opening the contacts upon occurrence of an overcurrent condition.

8. A current limiting circuit interrupter as set forth in claim 4, wherein said magnetic flux diverting yoke means comprises a U-shaped yoke member of magnetizable material with a pair of limbs connected at their ends, and further including a pair of insulation plates which are respectively disposed between each of the windings and the stationary contact in closely adjacent relation to the corresponding windings so as to protect the windings from being exposed to the arcing, said U-shaped yoke member being supported on the insulation plates with the other ends of the limbs in juxtaposed relation to the respective windings for magnetic coupling of the U-shaped yoke member to the windings.

9. A current limiting circuit interrupter as set forth in claim 1, further including a pair of insulation plates which are respectively disposed between each of the windings and the stationary contact in closely adjacent relation to the corresponding windings so as to protect the windings from being exposed to the arcing, said insulation plates being made of an ablative arc quenching material which produces hydrogen in gaseous form upon exposure to the arcing.

10. A current limiting circuit interrupter as set forth in claim 9, wherein said arc quenching material is polymethylpentene resin.

11. A current limiting circuit interrupter as set forth in claim 9, wherein said arc quenching material is polymethylmethacrylate resin.

12. A current limiting circuit interruptor as set forth in claim 8, wherein said insulating plates have a shield tang which extends over the substantial portion of the contact carrier except the stationary contact for shielding that portion from exposure to the arcing.

13. A current limiting circuit interrupter comprising:

a stationary contact formed on a fixed contact carrier;

a movable contact arm carrying a movable contact and being movable between a closed position in which the movable contact is in engagement witht the stationary contact and an open position in which the movable contact is separated from the stationary contact to defined therebetween an arc gap, arcing in said arc gap occurring along an arc path between the contacts as the contacts are moved from the closed position to the open position upon ocourrence of an overcurrent condition;

a pair of coaxial magnetic windings disposed on the opposite sides of the stationary contact and immediately adjacent thereto with the axis thereof extending transversely of the acr path; said magnetic windings being energized by a current flow through the contacts for producing within the windings thereof internal lines of magnetic force which pass transversely of the arc path to directly act on the arc formed between the contacts whereby driving the arc in one direction for elongation thereof in the initial stage of contact separation in which the arc path is relatively shorter and consequently to be totally under influence of the internal lines of magnetic force, said windings being formed integrally with the contact carrier and electrically connected in parallel relation with each other between the stationary contact and one of the terminals of the circuit interruptor;

a pair of insulation plates disposed between each of the windings and the stationary contact in closely adjacent relation to the corresponding windings so as to protect the windings from being exposed to the arc; and a U-shaped magnetic yoke adjacent said arc path and having two limbs connected at the ends, said magnetic yoke being supported on the insulation plates with the other ends of the limbs in juxtaposed relation with the individual windings for magnetic coupling of the yoke to the windings, the combination of the U-shaped magnetic yoke and the windings serving to divert along the yoke the external lines of magnetic force generated by the windings and passing outside thereof in order to prevent the external lines of magnetic force from acting advesely on the arc and to permit only the internal lines of the magnetic force to act on the arc in such a manner as to continuously drive the arc in series and in the same direction in the subsequent stage of contact separation where the arc path is elongated as the contacts are separated to extend past the region which is totally under the influence of the internal lines of magnetic force.

14. A current limiting circuit interruptor as set forth in claim 13, wherein said magnetic yoke is formed integrally with an arc driving yoke section which responds to the arc current itself for producing a magnetic field where the arc being elongated by the action of the magnetic windings is further driven to be elongated.

15. A current limiting circuit interrupter as set forth in claim 13, wherein said insulation plates are made of an ablative arc quenching material which produces hydrogen in gaseous form upon exposure to the arcing.

* * * * *